US006539372B1

United States Patent
Casey et al.

(10) Patent No.: US 6,539,372 B1
(45) Date of Patent: Mar. 25, 2003

(54) METHOD FOR PROVIDING AUTOMATED USER ASSISTANCE CUSTOMIZED OUTPUT IN THE PLANNING, CONFIGURATION, AND MANAGEMENT OF INFORMATION SYSTEMS

(75) Inventors: Bernice E. Casey, Woodstock, NY (US); Jose R. Castano, Fishkill, NY (US); George E. Corbin, Hyde Park, NY (US); Gregory L. Dunlap, Highland, NY (US); Kevin L. Godbey, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/442,361

(22) Filed: Nov. 17, 1999

(51) Int. Cl.[7] .............................. G06F 17/30; G06F 7/30
(52) U.S. Cl. .................................... 707/3; 707/2; 707/4
(58) Field of Search ................... 707/1–10, 100–104.1, 707/200–206, 500–542; 705/7–13, 25–29; 345/744–747, 780, 810–811, 825; 717/101–103, 120–127, 168–172, 174–178; 713/1–2, 100

(56) References Cited

U.S. PATENT DOCUMENTS

| 5,216,592 | A | * | 6/1993 | Mann et al. ................... 705/1 |
| 5,463,255 | A | * | 10/1995 | Ward et al. ................... 700/96 |
| 5,463,555 | A | * | 10/1995 | Ward et al. .................. 364/468 |
| 5,555,416 | A | * | 9/1996 | Owens et al. ................ 717/178 |
| 5,615,342 | A | * | 3/1997 | Johnson ........................ 705/24 |
| 5,844,554 | A | * | 12/1998 | Geller et al. ................. 345/744 |
| 5,860,012 | A | * | 1/1999 | Luu .............................. 717/175 |
| 5,930,513 | A | * | 7/1999 | Taylor ......................... 717/174 |
| 5,931,909 | A | * | 8/1999 | Taylor ......................... 709/221 |
| 5,963,743 | A | * | 10/1999 | Amberg et al. ............. 717/174 |
| 6,055,516 | A | * | 4/2000 | Johnson et al. ................ 705/27 |
| 6,070,149 | A | * | 5/2000 | Tavor et al. .................... 705/26 |
| 6,092,189 | A | * | 7/2000 | Fisher et al. .................... 713/1 |
| 6,128,624 | A | * | 10/2000 | Papierniak et al. ....... 707/104.1 |
| 6,167,383 | A | * | 12/2000 | Henson ........................ 703/13 |

* cited by examiner

Primary Examiner—Greta Robinson
Assistant Examiner—Linh Black
(74) Attorney, Agent, or Firm—William A. Kinnaman, Jr.

(57) ABSTRACT

User Assistants are software programs that prompt the customer for information about user's current system by examining system files and other sources of data; store information about the user in a repository for later retrieval or for access by other assistants; present customized instructions to the user on actions to take to complete planning, configuration, and management tasks; perform actions on behalf of the user (e.g., run programs, send e-mail requests, ship order forms) and track the user's progress through planning, configuration, and management tasks. The present invention provides customized output to support the implementation of a User Assistant. This output may be documentation, instructional steps, programs, or parameter files. This output is produced by combining product data, user input, and product rules.

20 Claims, 14 Drawing Sheets

| USER ASSISTANT | INPUT(S) | OUTPUT(S) | USER VIEW |
|---|---|---|---|
| ENROLLMENT | NONE | CUSTOMER PROFILE (CDR) | ENROLLMENT DIALOG |
| ORDERING | • CUSTOMER PROFILE (CDR)<br>• PRODUCT CATALOG (PIR)<br>• CUSTOMER INVENTORY (CDR)<br>• PRODUCT DEPENDENCY RULES (PIR) | UPDATED CUSTOMER INVENTORY (CDR)<br><br>UPDATED CUSTOMER PROFILE (CDR) | INTERVIEW DIALOG,<br>CUSTOM ORDER FORM |
| SETUP | • CUSTOMER PROFILE (CDR)<br>• CUSTOMER INVENTORY (CDR)<br>• MASTER CHECKLIST (PIR)<br>• INSTRUCTIONAL ARTICLES AND CODE TEMPLATES (PIR)<br>• ENVIRONMENT DETAILS (CDR) | UPDATED ENVIRONMENT DETAILS (CDR) | INTERVIEW DIALOG(S),<br>CUSTOM CHECKLIST,<br>CUSTOM INSTRUCTIONS |
| SERVICE | • CUSTOMER PROFILE (CDR)<br>• CUSTOMER INVENTORY (CDR)<br>• ENVIRONMENT DETAILS (CDR)<br>• SERVICE INFO BASE (PIR) | UPDATED CUSTOMER INVENTORY (CDR)<br><br>SERVICE REPORTS (CDR) | SERVICE AVAILABILITY DIALOG,<br>CUSTOM INSTRUCTIONS,<br>CUSTOM ORDER FORM AND/OR<br>SERVICE REQUESTS |

LEGEND: CDR=CUSTOMER DATA REPOSITORY
PIR=PRODUCT INFORMATION REPOSITORY

FIG.2

OS/390 V2R7 SELECTIONS          400

SELECT THE FEATURES THAT YOU WANT TO ORDER.

| OS/390 BASE CHOICES | VRM | GA DATE | PRODUCT ID |
|---|---|---|---|
| ⦿ OS/390 STANDARD BASE | 2.07.00 | 99/03/26 | 5647-A01 |
| ○ OS/390 ALTERNATE BASE | 2.07.00 | 99/03/26 | 5647-A01 |

| OS/390 OPTIONAL FEATURES (PRICED) | VRM | GA DATE | PRODUCT ID |
|---|---|---|---|
| ☐ BDT FILE-TO-FILE TRANSFER | 2.07.00 | 99/03/26 | 5647-A01 |
| ☐ BDT SNA RJE | 2.07.00 | 99/03/26 | 5647-A01 |
| ☒ BOOKMANAGER BUILD | 2.07.00 | 99/03/26 | 5647-A01 |
| ☒ C/C++ WITH DEBUG TOOL | 2.07.00 | 99/03/26 | 5647-A01 |
| ☐ C/C++ WITHOUT DEBUG TOOL | 2.07.00 | 99/03/26 | 5647-A01 |
| ☒ DFSMS DSS | 2.07.00 | 97/03/28 | 5647-A01 |
| ☐ DFSMS DSS + HSM | 2.07.00 | 97/03/28 | 5647-A01 |

401 — OS/390 STANDARD BASE
402 — OS/390 ALTERNATE BASE
403 — BDT FILE-TO-FILE TRANSFER
404 — BDT SNA RJE
405 — BOOKMANAGER BUILD
406 — C/C++ WITH DEBUG TOOL
407 — C/C++ WITHOUT DEBUG TOOL
408 — DFSMS DSS
409 — DFSMS DSS + HSM

FIG.4

CUSTOMER NAME: JOHN DOE, IBM
MIGRATING FROM: OS/390 V2R7
INSTALLATION METHOD: SERVERPAC

600

OS/390 V2R8 INSTALLATION CHECKLIST
(CLICK ON A TASK NAME FOR INSTRUCTIONS)

- [x] PREPARE THE DRIVING SYSTEM — 601a
- [x] ORDER TARGET SYSTEM SOFTWARE AND HARDWARE — 601b
- [ ] INSTALL OR UPGRADE TARGET SYSTEM HARDWARE, IF NECESSARY — 601c
- [ ] UPDATE COEXISTING SYSTEMS — 601d
- [ ] INSTALL YOUR SOFTWARE ORDER — 601e
- [ ] APPLY MAINTENANCE TO THE NEW SYSTEM, IF NECESSARY — 601f
- [ ] MIGRATE SOFTWARE AND APPLICATIONS — 601g
- [ ] BACK UP THE SYSTEM — 601h
- [ ] CUSTOMIZE AND TEST THE NEW SYSTEM — 601j
- [ ] PREPARE FOR FUTURE INSTALLATIONS — 601k

SAVE STATUS

DOCUMENT: DONE

FIG.6

INSTRUCTIONS: ORDER TARGET SYSTEM HARDWARE AND SOFTWARE | CHECKLIST

700

STEPS TO FOLLOW:

1. ORDER OS/390 AND RELATED PRODUCTS FROM IBM. MATERIALS YOU'LL NEED:
   - ORDER FORM
   - REFERENCE MATERIALS:
     - DESCRIPTION OF OS/390 BASE ELEMENTS AND OPTIONAL FEATURES
     - SOFTWARE REQUIREMENTS FOR OS/390 ELEMENTS AND FEATURES
     - IBM PRODUCTS THAT YOU CAN USE WITH OS/390

2. ORDER INDEPENDENT SOFTWARE VENDOR (ISV) PRODUCTS THAT YOU WANT TO RUN WITH OS/390. REFER TO THE FOLLOWING INFORMATION:
   - ISVs AND PRODUCTS THAT SUPPORT OS/390
   - INFORMATION ABOUT COMPATIBILITY BETWEEN ISV PRODUCTS AND OS/390

3. ORDER ANY ADDITIONAL HARDWARE OR HARDWARE UPGRADES THAT THE NEW SYSTEM MIGHT NEED. HERE IS INFORMATION THAT WILL HELP YOU:
   - OS/390 HARDWARE REQUIREMENTS

DOCUMENT: DONE

FIG.7

METHOD FOR PROVIDING AUTOMATED USER ASSISTANCE CUSTOMIZED OUTPUT IN THE PLANNING, CONFIGURATION, AND MANAGEMENT OF INFORMATION SYSTEMS

CROSS REFERENCE TO RELATED APPLICATIONS

The present invention is related and cross reference may be had to the following applications filed concurrently herewith and assigned to the same assignee as this application:

A METHOD FOR PROVIDING LIFE CYCLE AUTOMATED USER ASSISTANCE IN THE PLANNING, CONFIGURATION, AND MANAGEMENT OF INFORMATION SYSTEMS by Casey et al., Ser. No. 09/442,010; METHOD AND AN APPARATUS FOR PROVIDING CROSS MEDIA AUTOMATED USER ASSISTANCE IN THE PLANNING, CONFIGURATION, AND MANAGEMENT OF INFORMATION SYSTEMS by Casey et al., Ser. No. 09/441,585; and A METHOD AND AN APPARATUS FOR PROVIDING CROSS PRODUCT AUTOMATED USER ASSISTANCE IN THE PLANNING, CONFIGURATION, AND MANAGEMENT OF INFORMATION SYSTEMS by Casey et al., Ser. No. 09/442,436.

FIELD OF INVENTION

The present invention generally pertains to managing information systems (IS) processes and more particularly to automated processes for specifying IS products, integrating IS products, installing IS products, configuring IS products and upgrading IS products.

BACKGROUND OF THE INVENTION

Information systems (IS) is typically a title given to a corporate enterprise's data processing department. More literally, however, the term refers to the wide variety of tasks and tools used in data processing including the hardware and software products used for data processing, the processes followed to perform the data processing function, customer support and the like.

The implementation and maintenance of an information system is a highly complex process that involves multiple phases, each including multiple procedure steps, and a separation of activities across discrete product boundaries. The phases include planning; initial installation, configuration, and customization; ongoing maintenance; and eventual upgrade or product replacement. Today, practicing each of these phases is a largely manual and labor-intensive process. Within each of these separate phases, the required procedural steps are primarily driven by documentation (i.e., user guides and reference manuals) and accomplished by manual activity (e.g., copying files, editing settings . . . ). In addition, currently, phases of the implementation and subsequent customization of the information system are separate and not interconnected. This separation included ordering, packaging, installation or update, and supporting documentation. This separation meant that there was little or no knowledge within each phase about the results of a prior or related phase, other than that possessed by the person performing the phase. Each phase and its associated product and documentation components were designed to "stand alone" and provide general purpose support independent of prior phases or activities.

The current phase implementation is based primarily on product documentation, education and manual activity on the part of the person performing the implementation. The documentation is fixed, in that it is not a dynamic medium, being either hard copy or a soft copy representation of a hard copy book. The documentation is generally designed to address all possible implementation choices and is in no way tailored to the specific implementation performed. The shortcomings have been addressed to some degree with the introduction of programmatic installation "wizard" for workstation software. These wizards, however, did not address the totality of information delivery as well as product installation and subsequent customization and maintenance. Some products provided sample customization information, but this information was also generic to apply to all possible implementations and not custom tailored to a specific implementation of an information system.

Furthermore, even with the introduction of software wizards, there has not yet been a solution to address the full range of media involved in the implementation of an information system. The primary focus of installation wizards is typically a relatively simple software setup, including copying files and system registry update. These tasks fall short of the full range of user activities involved in implementing a complex information system. These activities extend well beyond the capability of current wizards and involve a close integration of programmatic actions, documentation, and user activity.

These previous solutions were also focused on individual products. This focus was consistent across planning, ordering, installation, customization, and upgrade. There was little or no inter-product activity and what was provided was primarily addressed through documentation (e.g., prerequisite products or hardware needed to install a product).

In light of the complexity inherent in implementing the various phases required by modern information systems and in absence of sophisticated automation tools, it is clear that what is needed is a set of integrated automated processes to enable a custom IS implementation.

SUMMARY OF THE INVENTION

The foregoing shortcomings of the prior art are addressed and further advantageous features provided by the present invention which entails an automated user assistance to provide customized output in the Planning, Configuration, and Management of Information Systems An embodiment of the invention provides customized output documentation, instructional steps, programs, or parameters in an automated IS process for creating and updating phases of an system.

A further aspect of the invention to use product data in creating a customized output.

A further feature of the invention to use product rules in creating a customized output.

Finally, a further feature of the invention to use user input in creating a customized output.

These and other objects of the invention are provided by interconnected "User Assistants" (UA). A series of interconnected User Assistants automatically guide IS professionals through the tasks of building and maintaining information systems. These tasks include, but are not limited to: system planning; product ordering; installing and configuring products; and upgrading system configurations. The User Assistants are software programs that:

prompt the customer for information (e.g., present choices to the user);

gather information about the user's current system by examining system files and other sources of data;

store information about the user in a repository for later retrieval or for access by other assistants;

present customized instructions to the user on actions to take to complete planning, configuration, and management tasks;

perform actions on behalf of the user (e.g., run programs, send e-mail requests, ship order forms)

track the user's progress through planning, configuration, and management tasks.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 2 depicts sharing among user assistants within the framework.

FIG. 4 illustrates an example of an order form created by an Ordering Assistant.

FIG. 6 depicts an example of a Setup Assistant customized checklist.

FIG. 7 depicts an example of a Setup Assistant instruction page

DETAILED DESCRIPTION OF THE PREFERRED EMBODIMENT OF THE INVENTION

Figure 1:
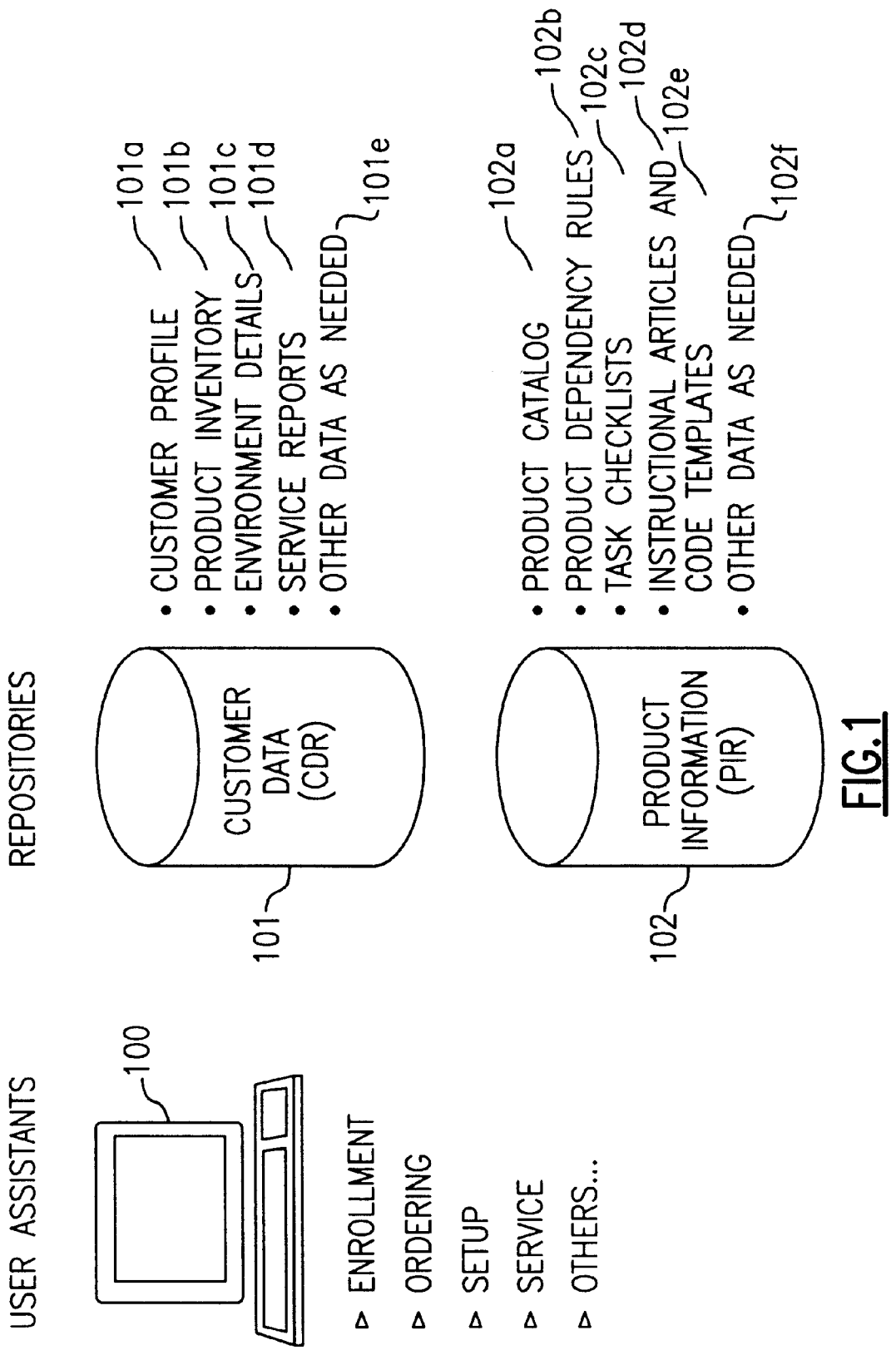
FIG. 1 depicts components of the Life-Cycle User Assistance Framework

User assistant tools that work together to provide a comprehensive "User Assistant Framework" are described herein that guide system administrators through various phases of the information system life-cycle, from planning, to configuration, to managing the system on a day-to-day basis.

The advantage of this invention can best be understood by use of a simple example as follows:

Example Scenario:

A museum wants to create an electronic storefront on the World Wide Web for its museum store. The museum's IS team has an existing computer system, but is not connected to the Internet.

Example Traditional solution:

The museum's IS staff would first determine what software and hardware products they need to build an Internet shopping site. They might read sales literature to determine this. They would then determine how to order the products they selected, and place the orders. After the products' arrival, they would install the products by following the instructions in various user guides and other sources of information. After installing all required products, the IS staff would be left to figure out how to configure the products to work together and how to create the on-line shopping site that the museum desired.

Example User Assistant Framework solution invented herein:

The museum's IS manager visits an e-business vendor's web site and requests assistance with planning. The e-Business Planning Assistant interviews the IS manager about the museum's business goals, and determines that goal is a shopping site that will be able to handle 10,000 customers a day, that will offer secure payment options, and that will link into the museum's existing inventory database. Based on this input, the Planning Assistant recommends a set of products and presents an on-line order form. The IS manager selects products from this list, and the Assistant places the order.

When the product shipment arrives, the IS staff is directed to the Setup Assistant for help with product installation and configuration. The Setup Assistant is tied into the customer database that was first established by the Planning Assistant. When the customer logs on, it retrieves the customer's profile from the database. It poses additional questions to the customer, as necessary, to gather the full complement of information that it needs to guide the customer through setup.

At the end of this dialog, the Setup Assistant presents a customized checklist of tasks that the IS staff must complete in order to set up their Internet shopping site. This checklist links the customer to a variety of media: articles with textual or graphic instructions on how to complete a task in the checklist, customized programs for the customer to run, and so forth.

The Setup Assistant stores data about the customer's configuration in the common repository. This information can then be accessed by other assistants that support day-to-day system management. For instance, a Service Assistant could use the data to alert the customer to code updates that are available.

End of Example Scenario

The components of the "User Assistant Life-Cycle Framework" are depicted in FIG. 1. FIG. 1 shows a user terminal 100 that could be stand-alone with portable media, internet attached or integral to the operating system. The user terminal provides a user interface to the "User Assistants." Assistants include an Enrollment Assistant which collects information about the user, an Ordering assistant which collects information about the user's data processing inventory and purchasing information, a Configuration Assistant to install and customize products, a Service Assistant to maintain installed products, and additional assistants as needed to monitor and upgrade products to meet the customer's requirements.

Figure 2A:
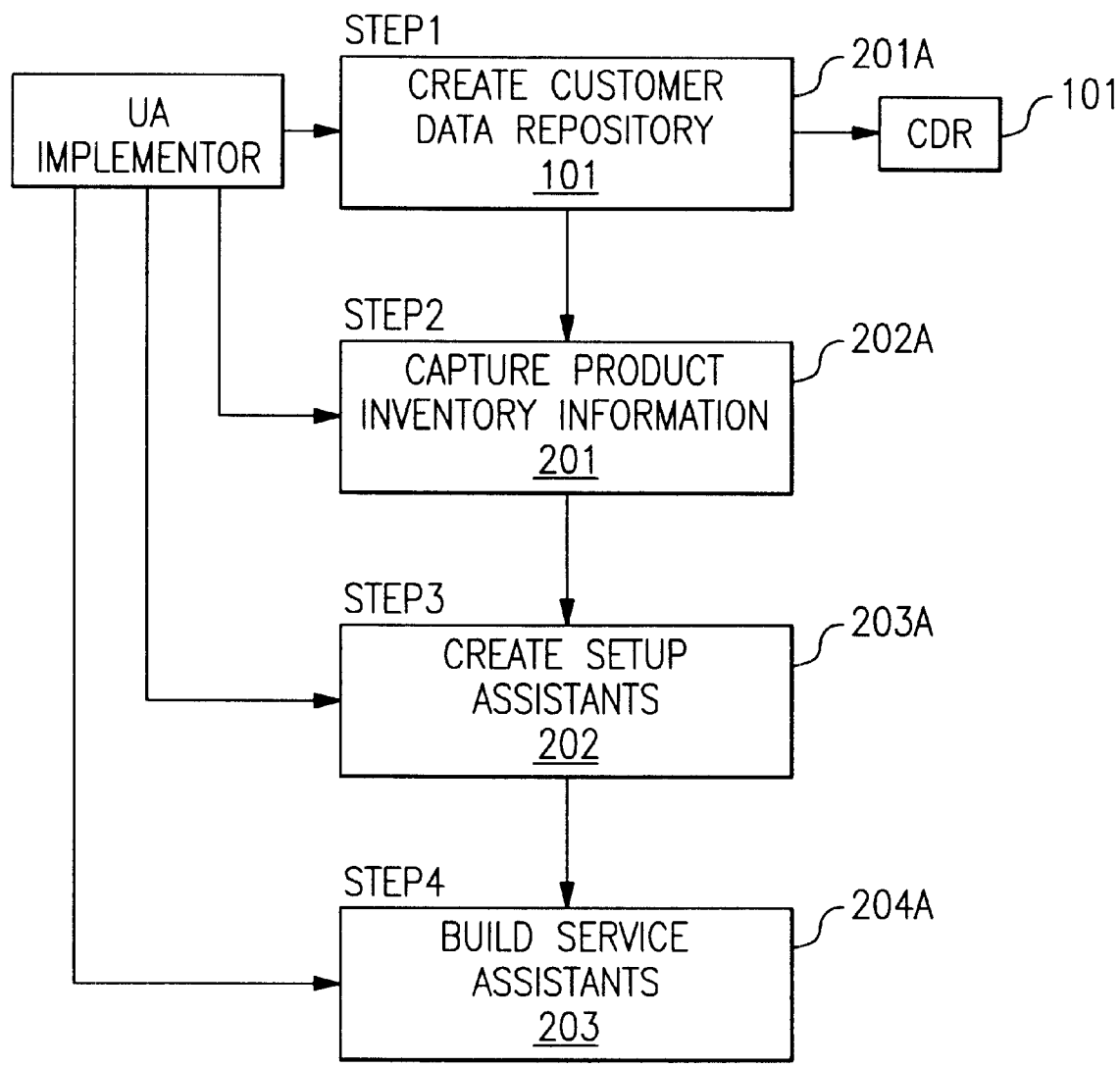
FIG. 2A illustrates a 4 step process for building a User Assistant Framework.

An example of the data that may be shared by the user assistants within the framework is summarized in FIG. 2. This data is accessed by the user assistants 100 to provide a life-cycle continuity between the various assistants. For example, the customer profile 101a created and stored in the Customer Data Repository (CDR) 101 during enrollment 200 may subsequently be used during ordering 201 for automating such tasks as billing and shipping. The CDR could be a single file or distributed on a plurality of storage media. For clarity of explanation, the reference to elements used in this invention are referred to generically and one skilled in the art would find suitable implementations that would be made obvious by the teaching of this invention. Each assistant can access this data to complete tasks specific to that assistant. In addition, each assistant may update the data, which is then used by subsequent assistants in the life-cycle. Some assistants (e.g., upgrade) may loop back to another assistant (e.g., planning) with new or updated data.

In the following sections, we describe how a 4 step example framework is constructed.

Step 1. Create a Customer Data Repository and an Enrollment Assistant 201A

The first step 201A in building a life-cycle framework is to create a customer data repository 101 for storing information about customers who will interact with the user assistants.

Existing database development tools can be used to build the repository. Examples of implementations include: a relational data base created using a product such as IBM® DB2®; a Lightweight Directory Access Protocol (LDAP) directory; or a Lotus® Notes database. The repository can reside on the customer's system, or can be maintained on an external, secure server by a vendor.

The structure for the repository is established by the "owning party" responsible for creating and maintaining the user assistant and for offering it as a service to customers. (Throughout this disclosure, we refer to the owning party as the user assistant (UA) implementor.)

The creation of a data repository 101 begins with data analysis. The UA implementor identifies the data that must be stored to support each customer task, from planning through ongoing management.

Figure 3:
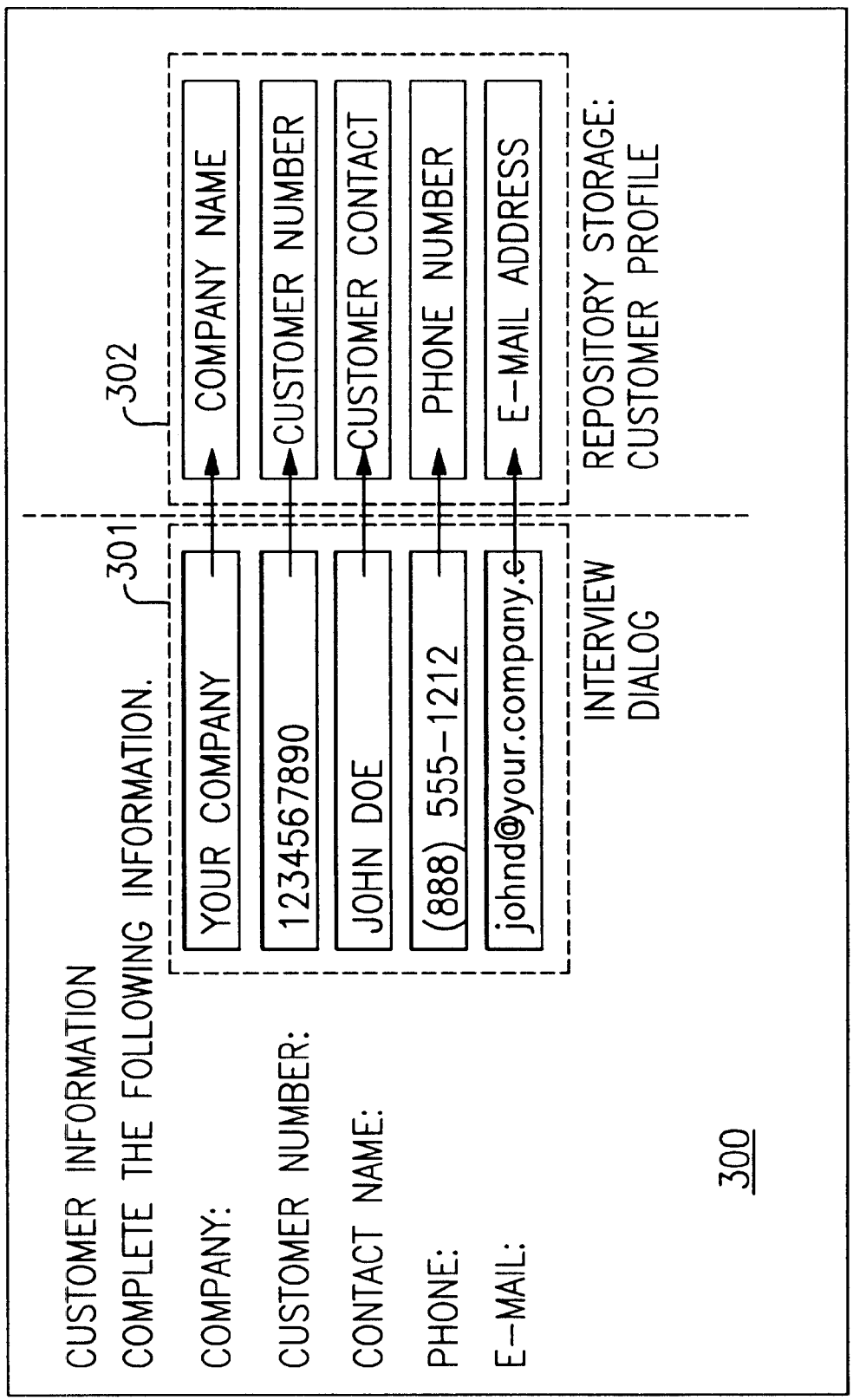
FIG. 3 depicts an Enrollment Assistant data flow that prompts the customer for information, and stores that information into the Customer Profile section of the Customer Data Repository.

The first set of data needed is the customer profile 101a which, by way of example, may includes the following types of data:

Customer name
User ID
Password
Customer account number
Phone number
FAX number
e-mail address
Company name
Company address
Ship-to address
Billing address and payment-related information
Other data as determined by the UA implementor Customer profile data is stored in the data repository 101 when the customer uses an enrollment assistant 200 for the first time. Upon first use, the enrollment assistant 200 assigns the customer a user ID and password. Next, the enrollment assistant 200 conducts an interview during which it gathers the profile information. At the completion of the interview the enrollment assistant 200 stores the results in the repository 101. Customers can log in at a later date to review and update their profiles. This process is illustrated in FIG. 3. The enrollment assistant 200 consists of program code that displays questions on a computer display screen. FIG. 3 shows a set of interview questions that were created using a combination of HTML tags and JavaScript code, and displayed on a User Terminal 100 using an Internet browser. A JavaScript function called saveFields( ) was created to perform the action of storing the data in the repository 101, and a function called getData( ) was created to retrieve data from the repository 101 and display it on the screen 100.

Once a customer is enrolled, the information in his profile information becomes available to other types of user assistants. When customers log in to the life-cycle framework, they select the type of support that they want (for example, planning and ordering 201, setup 202, or service 203), and the appropriate assistant is launched. The assistant reads the customer's information from the repository 101.

Step 2. Capture Product Inventory Information via an Ordering Assistant 202A

Another set of data that is required in the customer data repository is the customer product inventory 101b which describes each product that the customer owns. Products may include without limitation software, hardware and documentation. An example of the type of data required is:

Product name
Product ID
Date ordered
Order status (e.g., On order, shipped, received)

Note: These data fields are examples only. The actual fields selected would depend upon the UA implementor's product line.

An ordering assistant 201 is the mechanism for entering product inventory data 101b into the customer data repository 101. The ordering assistant (see FIG. 5) could be designed to simply present a product order form that is constructed from a vendor's catalog, or it could act as an "intelligent" assistant (see FIG. 5A) that interviews the customer about his business needs and recommends a set of products that best fulfill the customer's requirements. We describe these two mechanisms next.

Scenario 1, the product order form. In this scenario, a list of vendor products is collected into a database. The database can be implemented in a variety of ways; as a relational database or a Lotus Notes database, for example. The following table illustrates an example database structure:

| Product Name | Vendor | Product ID | Product type | Cost |
|---|---|---|---|---|
| OS/390 Version 2 Release 7 | IBM | 5678-A | Operating system | $0.00 |
| Database 2 | IBM | xxxx-xxx | Database | $0.00 |
| Lotus Domino 5.0 | IBM | xxxx-xxx | Groupware, e-business | $0.00 |
| WebSphere | IBM | xxxx-xxx | e-business, web serving | $0.00 |
| Net.Commerce | IBM | xxxx-xxx | e-business | $0.00 |

The ordering assistant builds the interactive checklist from this database. If the customer requests a list of products that support e-business applications, for instance, the ordering assistant would query the database for a list of products whose product type is "e-business." The results would be displayed on the screen, as illustrated in FIG. 4. This figure is an example from OS/390®, where the products listed have been selected and included in the list based on the customer responses in the interview. This checklist can then be used interactively by the customer to order products. Products selected from the checklist would be ordered, and information about the orders would be placed into the customer's product inventory database 101b.

Figure 5:
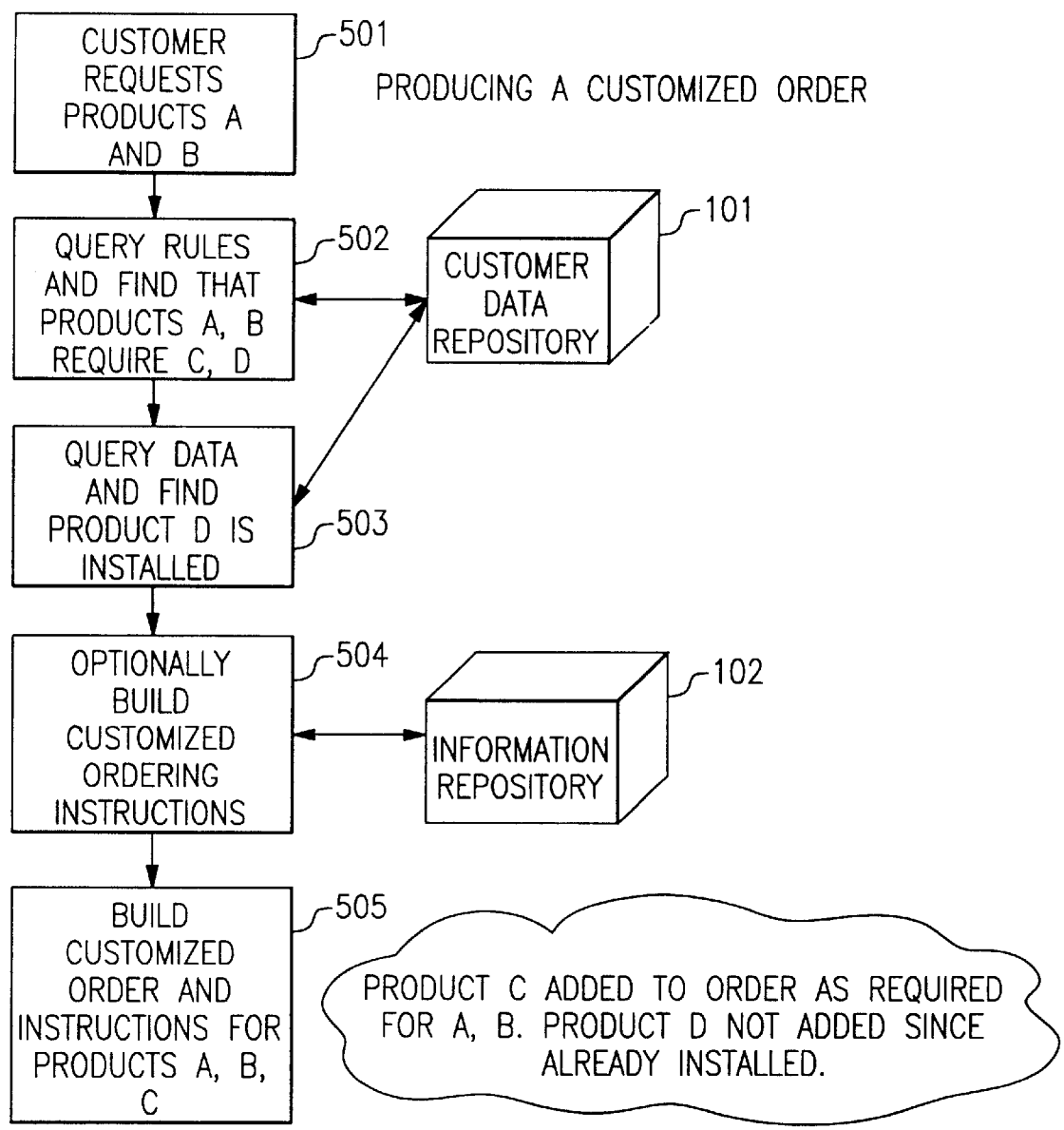
FIG. 5 depicts an Ordering Assistant process flowchart.
Figure 5A:
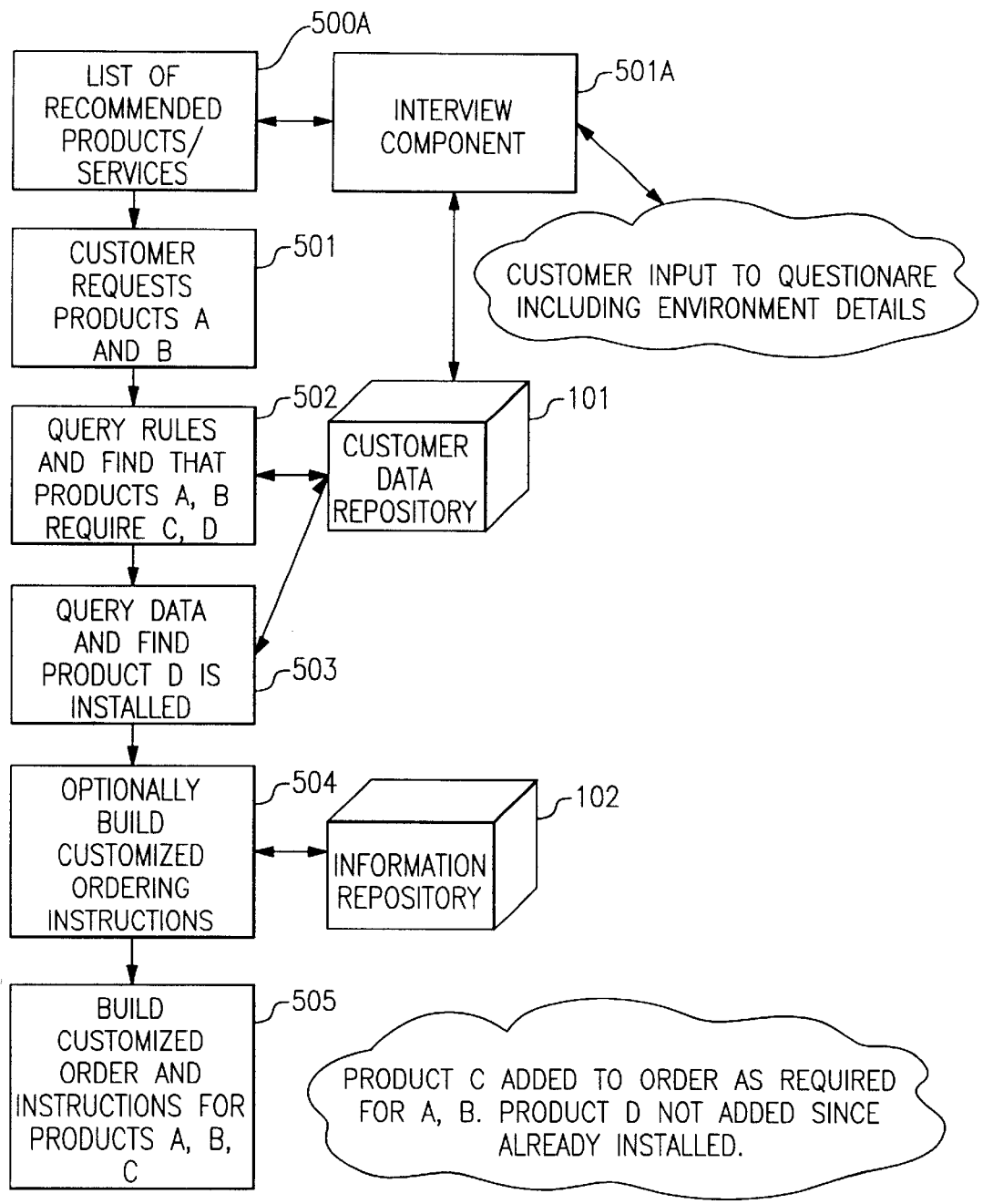
FIG. 5A depicts an "Intelligent" Ordering Assistant process flowchart.

An additional level of checking can be added to the Scenario 1, as shown in FIG. 5. In this example, a customer wants to order products A and B 501. The ordering assistant 201 consults the Product Information Repository 102 which stores the product catalog and which in turn contains information about product pre- and co-requisites 102b. According to the catalog, products A and B require that products C and D also be installed. The ordering assistant 201 queries the product inventory database 101b in the Customer Data Repository 101 and finds that the customer has product D but not product C 503. With this information as input, the ordering assistant 201 displays a customized order form which lists not only products A and B, but also product C, and explains that this product is a co-requisite 504,505.

Implementation of this type of ordering assistant 201 depends on the way in which the product database was implemented. For example, if the database was implemented using DB2®, the ordering assistant could be implemented as a software program (written in Java, for instance) that queries the DB2® database using a Structured Query Language (SQL) interface and displays the results of the query on the user's screen 100.

Scenario 2 (See FIG. 5A), the "intelligent" ordering assistant.

In this scenario, an interview component 501A is added to the ordering assistant. The assistant does more than present a list of products that meet search criteria. Rather, it engages in a dialog with the customer and builds a customized product order form 505.

The first question in the interview might be, "What type of business application do you want to build?" The customer would then select from a list of choices such as:

An electronic storefront
An on-line banking system
A travel reservation system
A research service Say that the customer selects "electronic storefront." This would trigger the next set of questions in the interview such as:

Is your company catalog already stored in a database? If yes, which database product did you use?

Do you want to develop an Internet, intranet, or extranet storefront?

How many customers do you expect to have per day? (ranges given)

What level of security will you need? (choices presented)

What programming language(s) do your programmers like to use? (choices presented)

Note that in addition to displaying information about product selections, the "intelligent" ordering assistant also captures additional data as part of its interview process. We call this additional data customer environment details 101c. This section is a storage area for decisions that the customer makes about his system and how he wants it to operate. The type of data stored is product and task-specific; the UA implementor must define data fields that are appropriate to the product and/or customer task.

After the customer completes the interview session, the ordering assistant analyzes the customer responses, and presents a set of recommended products and services 505.

This type of ordering assistant is implemented as a decision support application. The UA implementor creates a decision tree, and programs the assistant to follow the logic of that tree. The following example (example A) illustrates the logic flow:

---

Query: ApplicationType
Store: apptype
If apptype = storefront
    Query: Existing database?
If apptype = banking
    Query: . . .
If apptype = reservations
    Query: . . .
Query: Existingdatabase?
Store: dbready
Ifdbready = yes
    Query: Database product

---

Example A

In this example, the keyword Query indicates that the assistant is to display a dialog panel on the computer screen. This dialog could be implemented in a variety of ways; as an HTML page for instance. The keyword Store indicates that the assistant is to store the result of the dialog in the customer data repository under the field name specified.

Additional program logic is needed for stage two of the dialog in which the ordering assistant presents product and service selections to the customer.

An example of this logic (Example B) is:

---

If dbready = no
    Offer: QuickDB Service Package
If dbprod = DBB
    Offer: DBB Add-Ons V2.0

---

-continued

```
    . . .
    If security_level = highest
        Offer: Security PowerPack V1.3
    . . .
```

Example B

In this example, the keyword Offer launches a program function that pulls information about the product or service specified from the product database, and places it on the customized order checklist 505.

In all ordering scenarios, data is added to the product inventory when a customer orders a product or service. (See FIGS. 5 and 5A) For example, when a customer completes an order form, information about each of the products selected is added to the inventory section of the repository 101*b* (step 505 in FIGS. 5, 5A).

The product inventory section 101*b* of the repository 101 is critical because it is used by other user assistants. For example, a setup assistant 202 needs to know what products the customer has installed as a prerequisite to creating setup instructions for those products. Similarly, a service assistant 203 needs to understand the mixture of products that is installed in order to create a meaningful set of diagnostic recommendations.

Step 3. Create Setup Assistants 202A

Setup Assistants 202 pick up where ordering assistants 201 leave off.

The purpose of a setup assistant 202 is to provide customized, step-by-step instructions to a customer on how to configure a product or set of products. We call this set of instructions the customized checklist 600. FIG. 6 is an example of the output of this process and is a checklist for installing the IBM® operating system OS/390®. The checklist 600 consists of a series of tasks 601*a–k* for the user to complete (e.g., installation tasks), and a completion indicator (the check mark in FIG. 6). Each task 601*a–k* in the list is a "hot link;" that is, when the user selects the task (e.g., clicks on the task name), a new page is opened that guides the user through the completion of that task. This new page is called the instruction page 700 and contains detailed instructions on how to complete the task. FIG. 7 is an example of an instruction page. The customized instruction page in FIG. 7 is built by the Setup Assistant 202 using information from the selected products in the product inventory 101*b*. This information is selected as shown in FIG. 8, where rules are used to select and combine the required information provided by the various products.

Figure 8:
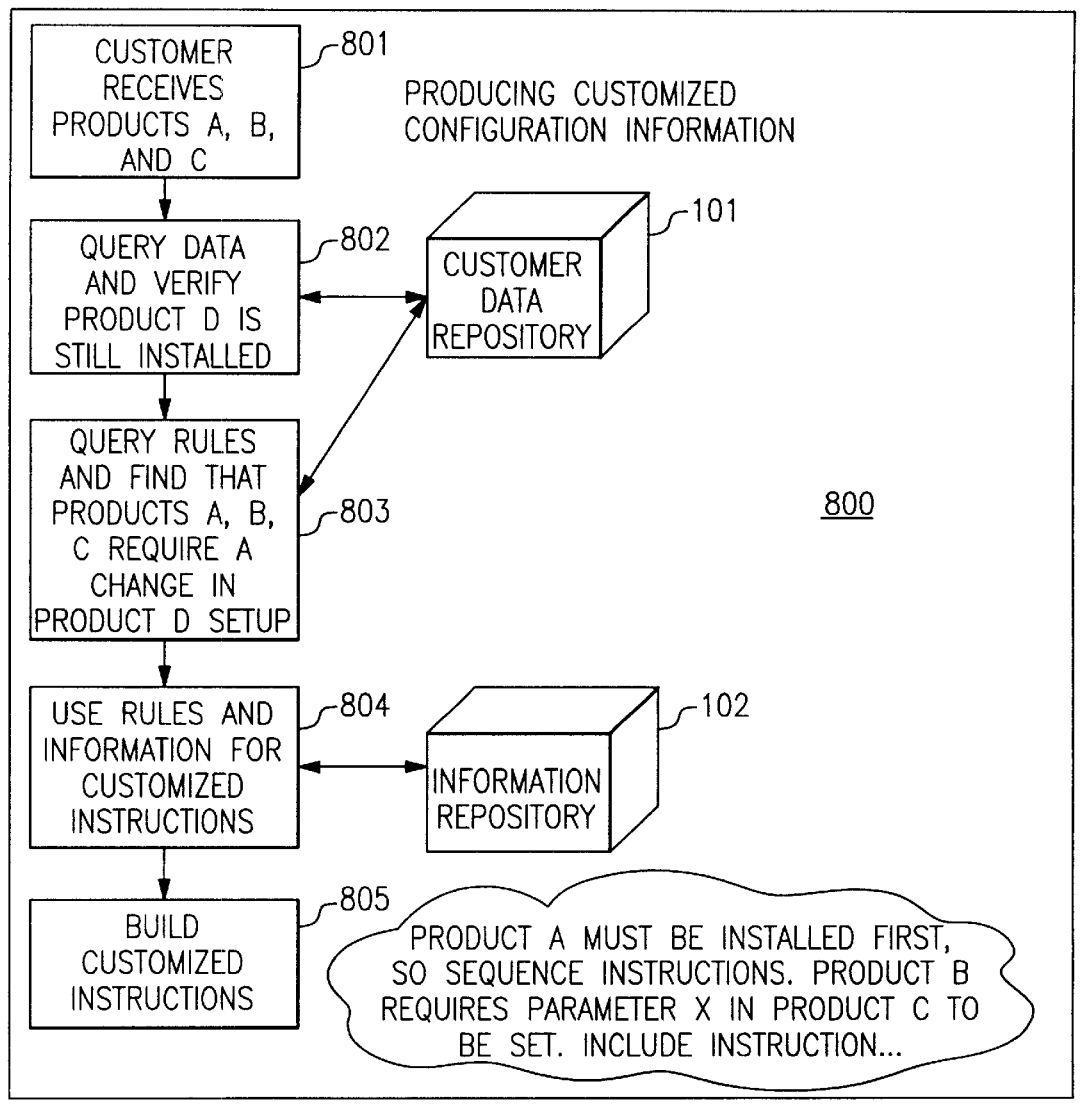
FIG. 8 depicts an example Setup Assistant process flowchart.
Figure 11:
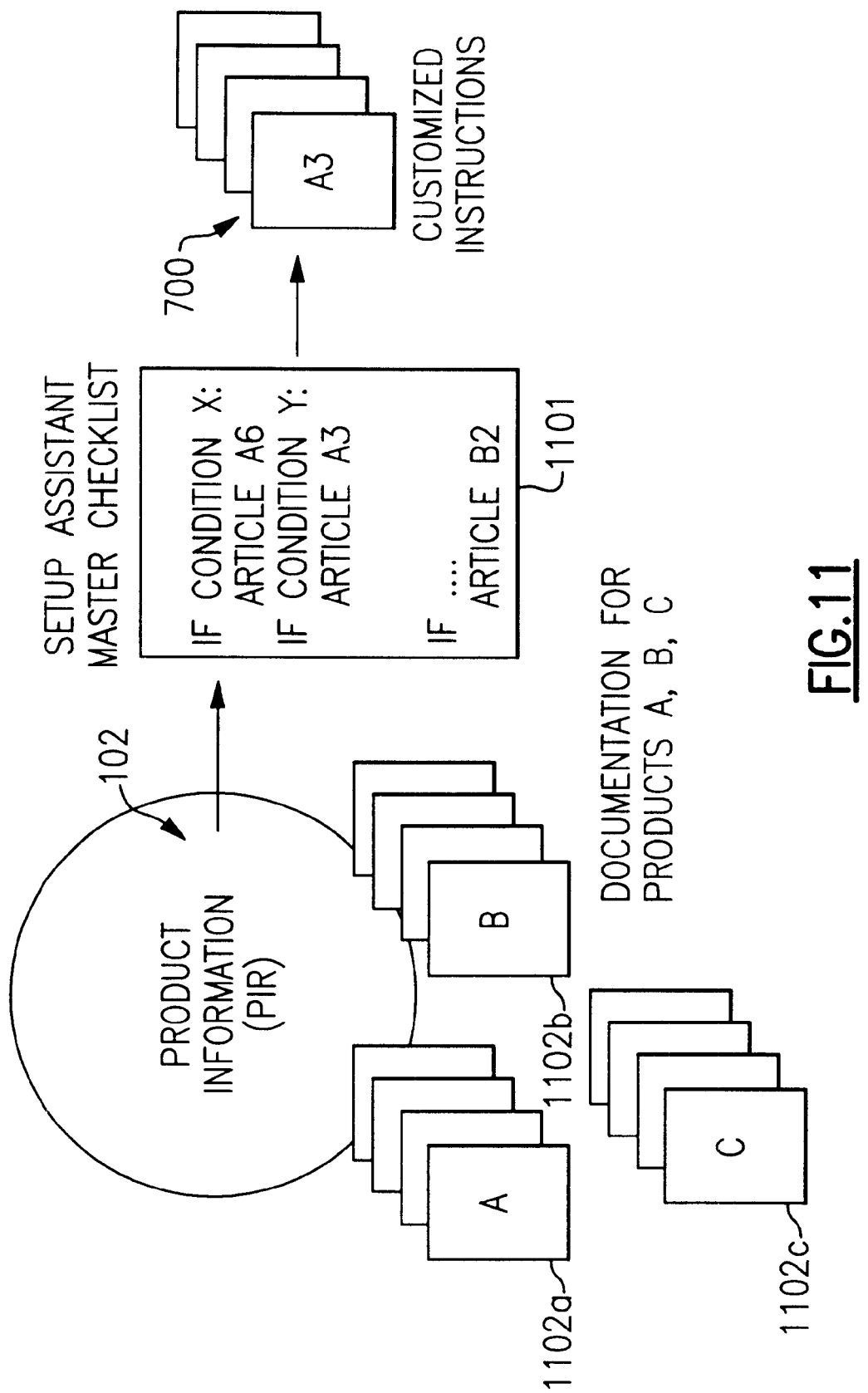
FIG. 11 illustrates constructing custom instructions from multiple information sources using logic embedded in the master checklist.

FIG. 8 illustrates the basic Setup Assistant 202 mechanism with an example that begins where FIG. 5 ended with the receipt of products A, B and C 801. FIG. 8 and FIG. 11 together show the method of building customized instructions. Documentation (text or alternate media) is provided by the products 102*a–e* and is available to the Setup Assistant 202. Rules within the Setup Assistant (e.g., If-then conditions as shown in the Master Checklist) are used to select the needed articles 803 (information) and combine them into a single set of customized setup instructions 805. The Master Checklist 1101 contains cross-product rules that can account for steps that may be repeated or are interdependent across the products. In the example in FIG. 5, a customer had ordered products A, B, and C. The products have been delivered, and the customer is ready to install and configure them. Using data stored in the Customer Data 101 and Product Information 102 repositories, the setup assistant constructs a combined checklist 1101 of tasks for installing products A, B, and C, and for customizing product D to work with A, B, and C.

Some important features of the checklist 1101 and the instruction page 700 are:

The list of tasks in the checklist 1101 is dynamic. The list is determined by the assistant 202, based on data stored in the customer data repository 101. For example, if a customer does not require a secure web site, the instructions for building a secure site would not be included in the checklist.

Each instruction page 700 is dynamic; the instructions are tailored to the customer's unique environment. For instance, two customers might have the task "Set up secure payments" on their checklists, but the set of instructions provided could differ.

Figure 9:
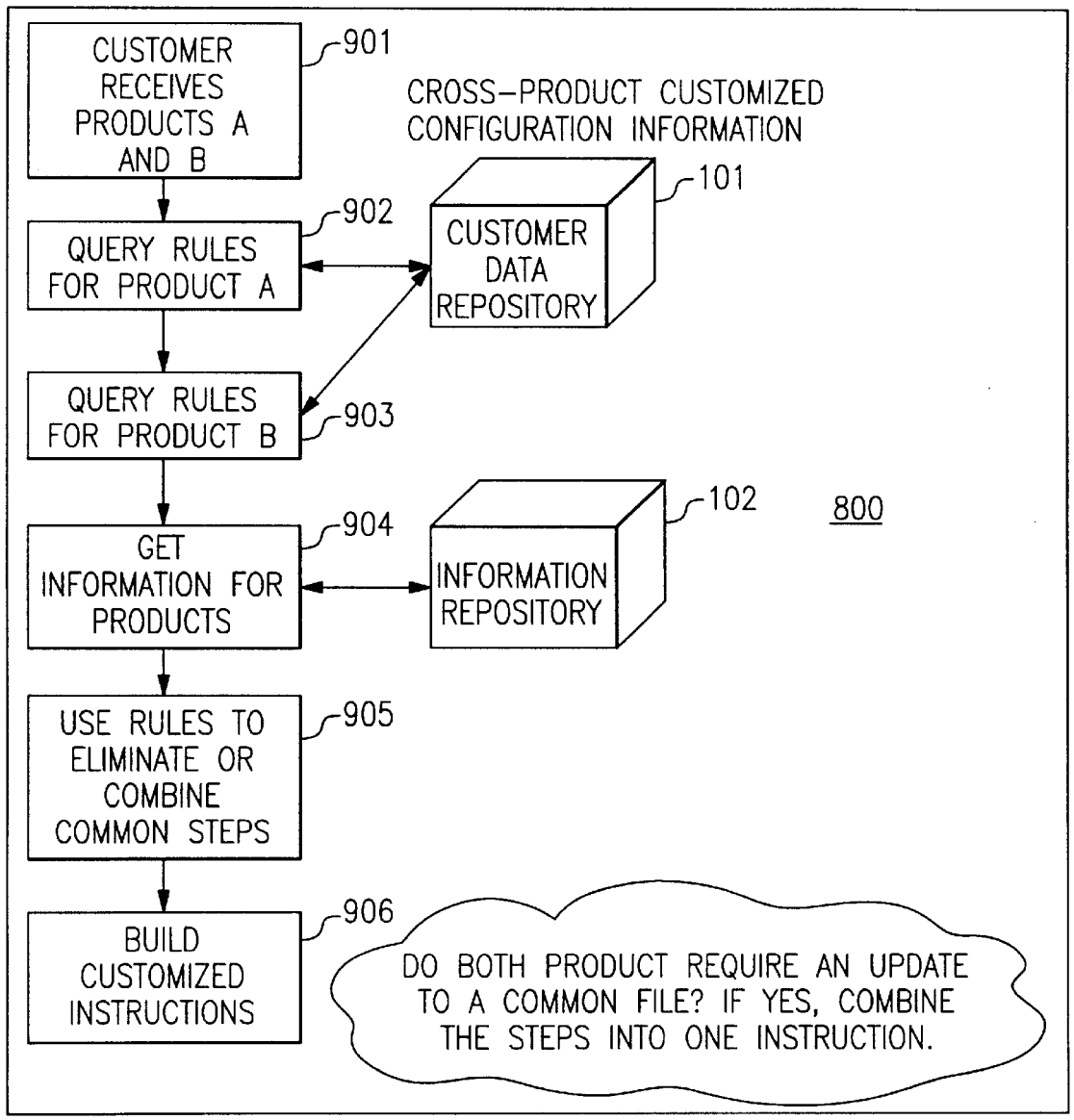
FIG. 9 illustrates producing cross-product customized configuration information.

Each instruction page 700 can span multiple products. As shown in FIG. 9, the product rules 102 can be used to eliminate or modify instruction steps 905 so that a single instruction page can be used for multiple products 906.

Figure 10:
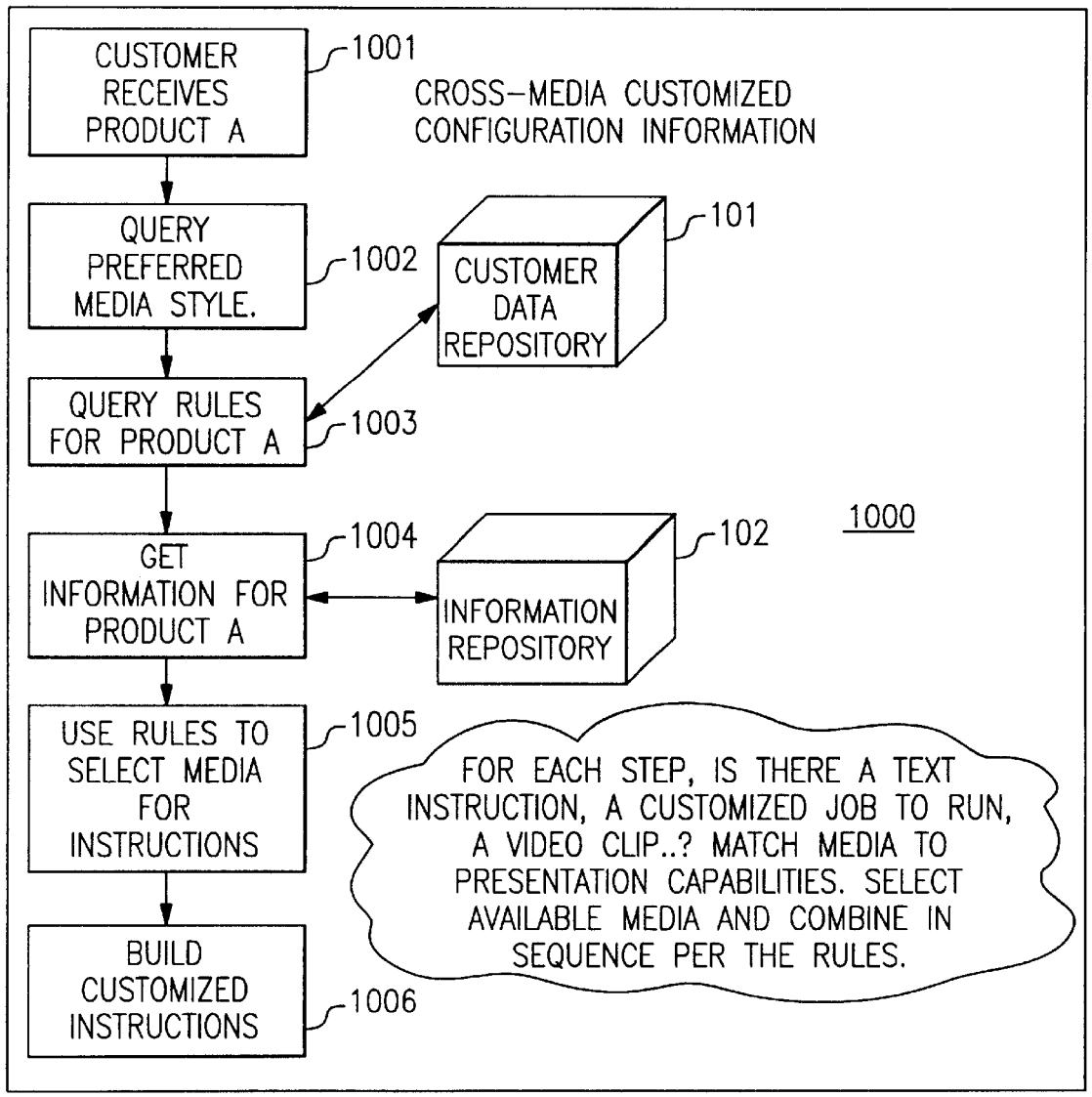
FIG. 10 illustrates producing cross-media customized configuration information.

Each instruction page 700 can include varied media types, as shown in FIG. 10. As supported by the presentation method for the instruction page 700, the page could include text, audio instruction, video instructions, as well as other media 1002, 1005.

In addition to presenting textual information, the instruction page can offer other types of customized output such as customized code. We define customized code as computer programs or command lists that have been tailored for the customer. The customer may execute this code as part of product setup.

Customized instruction pages 700 are built from a repository of instructional articles. For each task in the master checklist 1101, and each variation on a task, there is an article 1102*a–c* that contains instructions on how to perform that task. Pointers to these articles are in the master checklist. When the customized checklist is built, it includes links to the relevant instructional articles 1102*a–c*, which may actually reside in larger documents in the product inventory repository. Thus, as shown in FIG. 11, a single "virtual" user's guide (Customized instructions) 700 is constructed from a many hundreds of articles 1102*a–c* that might appear in dozens of individual user's guides (documentation for products A, B, C) by selectively extracting the appropriate articles using the Setup Assistant Master Checklist with code that corresponds articles with criteria (condition x, y . . . ) where the criteria is implementation dependent.

Similarly, customized code is built from code templates that are stored in another repository. These templates contain place holders for variable data. (For example, a place holder for a file name could be &filename.) When the code is prepared for a particular customer, the variables in the template are substituted with values derived from the customer data inventory 101*b*. (For example, if the customer chose a file name of C:/temp/myfile.txt, that name would be substituted for &filename.)

Construction of a setup assistant begins with the creation of the master checklist 1101. This checklist describes every possible task that a customer might perform within a given task domain (such as "install OS/390®"). It also contains the logic that determines whether or not a task in the master checklist 1101 should appear on the customized checklist.

The master checklist 1101 can be implemented in a number of ways, using a variety of programming languages. For instance, HTML and JavaScript can be used to build the checklist and to link to supporting pages. An XML implementation is also feasible as the following example shows:

Example C

```
<CHECKLIST>
    <NAME>Install OS/390</NAME>
    <TASK>
        <TASK_NAME>Prepare the driving system
        </TASK_NAME>
        <CONDITION>VALUE instmeth = ServerPac
        </CONDITION>
        <ACTION>link statement</ACTION>
    </TASK>
</CHECKLIST>
```

In this example (Example C), the task "Prepare the driving system" will appear on the customer's customized checklist if they are installing OS/390 using the ServerPac method (instmeth=ServerPac). If the task name were displayed and the customer selected it from the list, then the code bracketed by the ACTION tags would be executed.

Note that in this example, a variable value (instmeth) determines whether or not to display the task name. This piece of data resides in the customer data repository 101. It might have been placed there by a different user assistant, perhaps an ordering assistant 201. However, if the data is not available, the setup assistant 202 would conduct an interview session (see example FIG. 5A) with the customer prior to displaying the checklist similar to as described for order assistant.

The interview consists of a series of questions to which the user responds. The UA implementor determines which questions to ask, based on the type of task being performed. For example, if the assistant is helping the user install the OS/390 IBM® operating system, the assistant needs to know if the user is already running an older version of OS/390, a different operating system, or no operating system in order to give the user the correct instructions. The user interface would include an interview question asking the user what version of the operating system, if any, they are currently running.

As the user proceeds through the interview and makes choices, the assistant stores the user's responses in the customer data repository 101. At any time, the user can leave the interview and return at a later date to complete it. When the user returns to the interview, the assistant retrieves the data that was last saved in the repository for that user.

The interview component can be implemented in a number of ways, using a variety of programming languages. For instance, HTML and JavaScript can be used to control the interview dialog and to retrieve and store data. An Extensible Markup Language (XML) implementation is also feasible:

Example D

```
<INTERVIEW>
    <QUESTION>
        <PROMPT>Which installation method are you using?
        </PROMPT>
        <S_CHOICE>
            <VALUE>instmeth</VALUE>
            <ITEM>ServerPac</ITEM>
            <ITEM>CBPDO</ITEM>
            <ITEM>SystemPac</ITEM>
        </S_CHOICE>
    </QUESTION>
</INTERVIEW>
```

In this XML example (Example D), the user's choice would be stored in the data repository as the data element "instmeth." It could then be retrieved later by any user assistant with access to the repository.

Step 4. Build Service Assistants 204A

Figure 12:
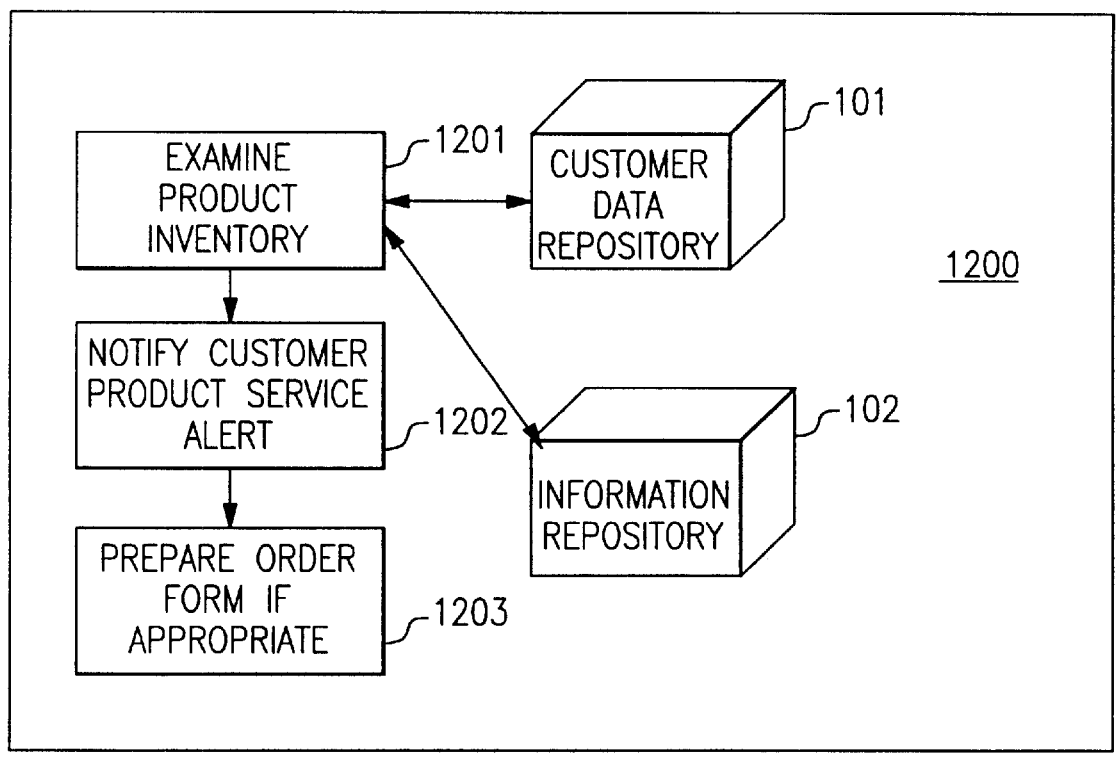
FIG. 12 illustrates an example service assistant process flow.

After products have been set up, it's likely that they will need periodic maintenance (see FIG. 12). Service assistants 1200, 203 are provided for that purpose. A service assistant periodically examines the customer's product inventory 102, determines if corrective services are available, and notifies the customer.

The Service Assistant might also determine that newer versions of some of the customer's products are available and notify the customer of those upgrades 1202. If the customer is so inclined, the Service Assistant would prepare an order 1203 form for the customer's approval, submit the order, and update the product inventory. Thus, the system life-cycle comes full circle.

Dynamic System Data and the Framework

As described in the previous examples, user assistants query the Customer Data Repository 101 for information that they need to build the customized output such as custom order forms, checklists, and instructional pages. However, another source of data for the assistants is dynamic data that is contained within the information system that the customer manages.

As an example, we can conceive of a troubleshooting assistant that would require data from the running system such as current CPU utilization. Access to this data would allow the troubleshooting assistant to suggest possible problems in the system, and to recommend corrective actions.

To implement this approach, the UA implementor would program the assistant to access the running system (via a TCP/IP connection, for example), read the specified system data, and process it.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for generating a customized output relating to an information system product in a specified user environment, comprising the steps of:

providing product data containing items relating to said product;

providing user data specifying a user environment for said product;

providing a set of rules for selecting, on the basis of said user data, items of said product data for inclusion in a customized output for said product; and using said set of rules to select said items of said product data and combine the selected items into said customized output for said product.

2. The method of claim 1 in which said customized output comprises documentation.

3. The method of claim 1 in which said customized output comprises a set of installation instructions.

4. The method of claim 1 in which said customized output comprises executable code.

5. The method of claim 1 which each of said rules specifies a condition and an item to be included in said customized output if the condition is satisfied.

6. The method of claim 1 in which said rules specify an order in which said items are included in said customized output.

7. The method of claim 1 in which said rules are generated on the basis of said user data.

8. The method of claim 1 in which said rules are generated on the basis of said product data.

9. The method of claim 1 in which said user data is stored as persistent data in a repository.

10. The method of claim 9 in which said user data is obtained by interviewing a user if it is unavailable from said repository.

11. Apparatus for generating a customized output relating to an information system product in a specified user environment, comprising:

means for providing product data containing items relating to said product;

means for providing user data specifying a user environment for said product;

means for providing a set of rules for selecting, on the basis of said user data, items of said product data for inclusion in a customized output for said product; and means for using said set of rules to select said items of said product data and combine the selected items into said customized output for said product.

12. The apparatus of claim 11 in which said customized output comprises a set of installation instructions.

13. The apparatus of claim 11 in which each of said rules specifies a condition and an item to be included in said customized output if the condition is satisfied.

14. The apparatus of claim 11 in which said user data is stored as persistent data in a repository.

15. The apparatus of claim 14 in which said user data is obtained by interviewing a user if it is unavailable from said repository.

16. A program storage device readable by a machine, tangibly embodying a program of instructions executable by the machine to perform method steps for generating a customized output relating to an information system product in a specified user environment, said method steps comprising:

providing product data containing items relating to said product;

providing user data specifying a user environment for said product;

providing a set of rules for selecting, on the basis of said user data, items of said product data for inclusion in a customized output for said product; and using said set of rules to select said items of said product data and combine the selected items into said customized output for said product.

17. The program storage device of claim 16 in which said customized output comprises a set of installation instructions.

18. The program storage device of claim 16 in which each of said rules specifies a condition and an item to be included in said customized output if the condition is satisfied.

19. The program storage device of claim 16 in which said user data is stored as persistent data in a repository.

20. The program storage device of claim 19 in which said user data is obtained by interviewing a user if it is unavailable from said repository.

* * * * *

UNITED STATES PATENT AND TRADEMARK OFFICE
CERTIFICATE OF CORRECTION

PATENT NO.     : 6,539,372 B1
DATED          : March 25, 2003
INVENTOR(S)    : Bernice Casey et al.

It is certified that error appears in the above-identified patent and that said Letters Patent is hereby corrected as shown below:

<u>Column 13,</u>
Line 13, "The method of claim 1 which each of said rules" should read -- The method of claim 1 in which each of said rules --

Signed and Sealed this

Nineteenth Day of August, 2003

JAMES E. ROGAN
*Director of the United States Patent and Trademark Office*